(12) United States Patent
Billmaier

(10) Patent No.: US 10,730,395 B2
(45) Date of Patent: Aug. 4, 2020

(54) AUTOMATIC AND DYNAMIC HOME ELECTRICITY LOAD BALANCING FOR THE PURPOSE OF EV CHARGING

(71) Applicant: ChargePoint, Inc., Campbell, CA (US)

(72) Inventor: James A. Billmaier, Woodinville, WA (US)

(73) Assignee: CHARGEPOINT, INC., Campbell, CA (US)

( * ) Notice: Subject to any disclaimer, the term of this patent is extended or adjusted under 35 U.S.C. 154(b) by 3 days.

(21) Appl. No.: 15/950,086

(22) Filed: Apr. 10, 2018

(65) Prior Publication Data

US 2019/0111798 A1   Apr. 18, 2019

Related U.S. Application Data

(63) Continuation of application No. 14/198,277, filed on Mar. 5, 2014, now Pat. No. 9,937,812, which is a
(Continued)

(51) Int. Cl.
*H02J 7/00* (2006.01)
*B60L 11/18* (2006.01)
(Continued)

(52) U.S. Cl.
CPC .......... *B60L 11/1848* (2013.01); *B60L 53/14* (2019.02); *B60L 53/63* (2019.02); *B60L 53/64* (2019.02);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS 5,696,367 A   12/1997 Keith
6,373,380 B1   4/2002 Robertson et al.
(Continued)

OTHER PUBLICATIONS

Abandonment from U.S. Appl. No. 14/198,277, dated Jul. 29, 2016, 2 pages.
(Continued)

*Primary Examiner* — Arun C Williams
(74) *Attorney, Agent, or Firm* — Nicholson De Vos Webster & Elliott LLP

(57) ABSTRACT

An electric vehicle charging system includes logic collocated with an electric service panel to monitor a total present electric current consumption value for all electric consumers below a point in the service panel; a first input to receive the present electric current consumption value from the logic collocated with the service panel, and to compare the present electric current consumption value with a maximum current capacity value for the service panel; a second input to receive electric current from the service panel; an output to supply electric charging power to at least one electric vehicle; and logic to set an electric charging current drawn from the service panel through the second input and provided to the electric vehicle charging output to a value less than a difference between the maximum current capacity for the service panel and a sum of the present electric current consumption value and the current consumption value of a largest expected electric consumer.

21 Claims, 2 Drawing Sheets

Related U.S. Application Data continuation of application No. 13/492,894, filed on Jun. 10, 2012, now Pat. No. 8,723,478, which is a continuation of application No. 13/047,761, filed on Mar. 14, 2011, now Pat. No. 8,232,765.

(60) Provisional application No. 61/313,717, filed on Mar. 13, 2010.

(51) Int. Cl.
| | |
|---|---|
| *H02J 3/02* | (2006.01) |
| *B60L 53/66* | (2019.01) |
| *B60L 53/65* | (2019.01) |
| *B60L 53/64* | (2019.01) |
| *B60L 53/14* | (2019.01) |
| *B60L 55/00* | (2019.01) |
| *B60L 53/63* | (2019.01) |

(52) U.S. Cl.
CPC ............ *B60L 53/65* (2019.02); *B60L 53/665* (2019.02); *B60L 55/00* (2019.02); *H02J 3/02* (2013.01); *B60L 2240/72* (2013.01); *Y02E 60/721* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01); *Y10T 307/438* (2015.04)

(58) Field of Classification Search
USPC ....................................................... 320/109
See application file for complete search history.

(56) References Cited

U.S. PATENT DOCUMENTS

| | | | |
|---|---|---|---|
| 7,830,117 | B2 | 11/2010 | Ambrosio et al. |
| 7,888,912 | B2 | 2/2011 | Morita et al. |
| 8,054,048 | B2 | 11/2011 | Woody et al. |
| 8,058,836 | B2 | 11/2011 | Ichikawa et al. |
| 8,106,627 | B1 | 1/2012 | Rossi |
| 2004/0130292 | A1 | 7/2004 | Buchanan et al. |
| 2008/0136371 | A1 | 6/2008 | Sutardja |
| 2008/0180058 | A1* | 7/2008 | Patel .................. B60H 1/00428 320/109 |
| 2008/0218121 | A1 | 9/2008 | Gale et al. |
| 2008/0231230 | A1* | 9/2008 | Gale .................... H02J 7/0072 320/109 |
| 2009/0062967 | A1 | 3/2009 | Kressner et al. |
| 2009/0115368 | A1* | 5/2009 | Bullis ...................... H02J 3/38 320/101 |
| 2009/0313034 | A1 | 12/2009 | Ferro et al. |
| 2009/0315512 | A1 | 12/2009 | Ichikawa et al. |
| 2010/0082277 | A1* | 4/2010 | Ballard .................. B60L 53/00 702/63 |
| 2010/0106631 | A1 | 4/2010 | Kurayama et al. |
| 2010/0145535 | A1* | 6/2010 | Tyler .................... G06Q 50/06 700/292 |
| 2010/0283426 | A1* | 11/2010 | Redmann ................ B60L 53/53 320/109 |

OTHER PUBLICATIONS

Final Office Action from U.S. Appl. No. 14/198,277, dated Apr. 27, 2017, 15 pages.
Final Office Action from U.S. Appl. No. 14/198,277, dated Dec. 22, 2015, 15 pages.
Non-Final Office Action from U.S. Appl. No. 13/047,761, dated Dec. 7, 2011, 9 pages.
Non-Final Office Action from U.S. Appl. No. 13/492,893, dated May 24, 2013, 7 pages.
Non-Final Office Action from U.S. Appl. No. 13/492,894, dated Jun. 21, 2013, 6 pages.
Non-Final Office Action from U.S. Appl. No. 14/198,277, dated Apr. 2, 2015, 11 pages.
Non-Final Office Action from U.S. Appl. No. 14/198,277, dated Oct. 6, 2016, 16 pages.
Notice of Allowance from U.S. Appl. No. 13/047,761, dated May 15, 2012, 5 pages.
Notice of Allowance from U.S. Appl. No. 13/492,893, dated Sep. 20, 2013, 6 pages.
Notice of Allowance from U.S. Appl. No. 13/492,894, dated Dec. 30, 2013, 6 pages.
Notice of Allowance from U.S. Appl. No. 14/198,277, dated Dec. 1, 2017, 5 pages.

\* cited by examiner

AUTOMATIC AND DYNAMIC HOME ELECTRICITY LOAD BALANCING FOR THE PURPOSE OF EV CHARGING

PRIORITY

This application is a continuation of U.S. application Ser. No. 14/198,277, filed Mar. 5, 2014, which is a continuation of Ser. No. 13/492,894, filed Jun. 10, 2012, now U.S. Pat. No. 8,723,478, which is a continuation of Ser. No. 13/047,761, filed Mar. 14, 2011, now U.S. Pat. No. 8,232,765, which claims the benefit of U.S. Provisional Application No. 61/313,717, filed Mar. 13, 2010.

BACKGROUND

Internal Combustion Engine (ICE) vehicles will be replaced by Electric Vehicles (EVs) over the coming years. The purchase and use of EVs is poised to rapidly expand in the United States in the near term. It is estimated that as much as 80% of the electrical charging for these vehicles will be accomplished at the owner's residence. The typical charging requirement for EVs, where more than 1-2 hours is available for the process, will be done with a "Level II" charger. A Level II charger provides 220 Volts of charging capability, usually at 30-40 Amps. This is a significant load on the typical U.S. electric energy supply. Almost all U.S. homes have a master panel that provides 200 Amps or less of electric capacity. Many are 125 Amps or 100 Amps, which makes charging an EV a considerable percentage of the available home electric power. The cost of upgrading or replacing the master service panel in the home can be quite expensive, and in some cases, not possible. This choke point and the expense involved in upgrading the home electric service may suppress the ability for a large part of the U.S. population to move to EVs. This problem is exacerbated when the possibility of two or more EVs per home is taken into account.

This same problem may be extrapolated to public charging stations. Just as a home service panel may approach its capacity in serving electrical demands, so too may a commercial site have an electric service panel that is undersized relative to the need when EV charging demand is added.

Level II charging infrastructure requires expensive circuitry and wiring that is dedicated to one EV at a time. It is also the case that EVs will often occupy a parking bay, at home or in a public parking space, for hours after their EV battery packs are fully charged. This underutilizes the costly EV charging infrastructure.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Figure 1:
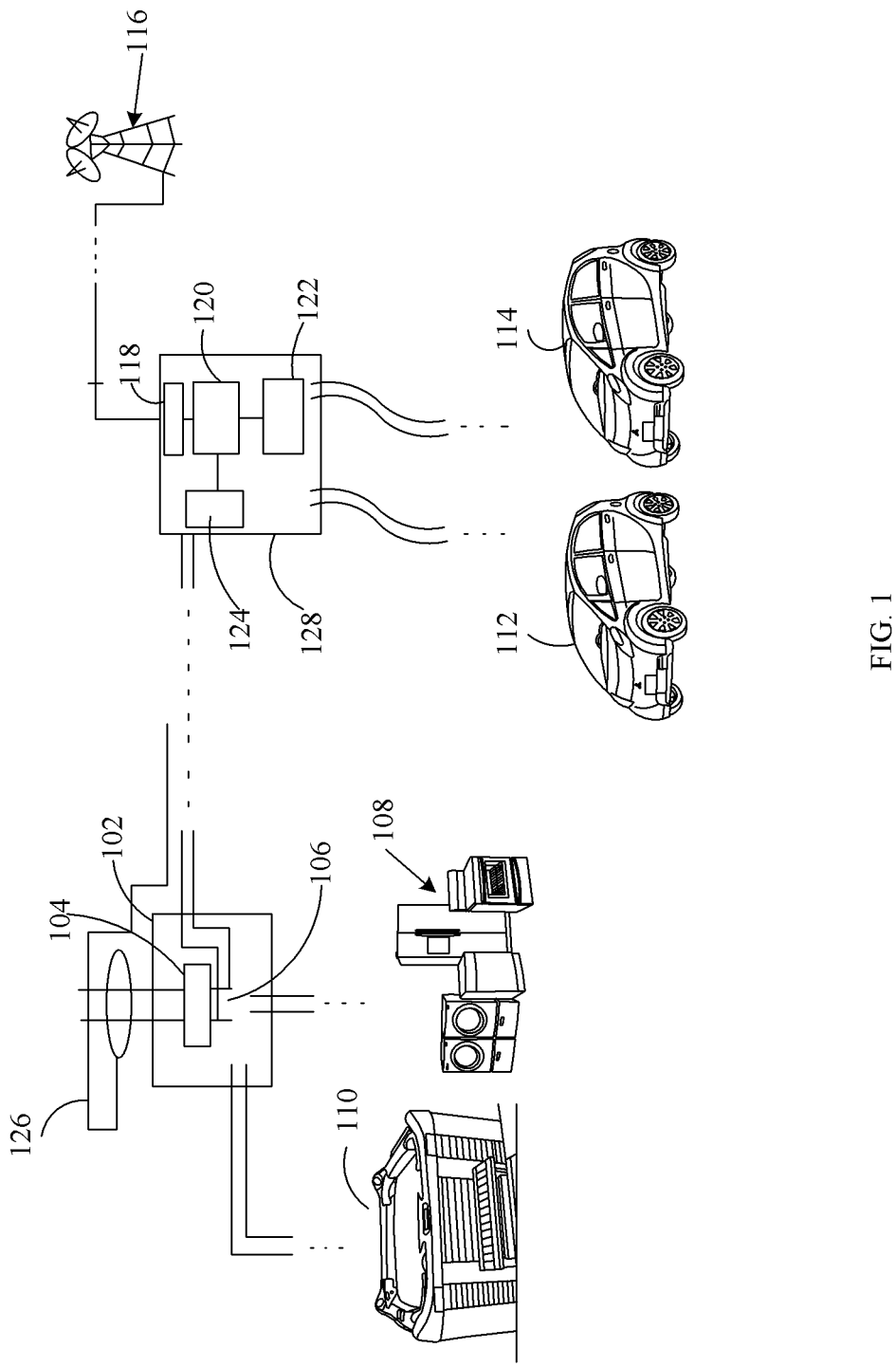
FIG. 1 is an illustration of an embodiment of an electric vehicle charging environment.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to circuitry and/or machine-readable media (e.g. memory or other non-transitory electronic or optical circuits or media) physically adapted to influence the operation of a device. Magnetic media, circuits, electrical and optical memory, and firmware are examples of logic.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more devices. The particular distribution and choice of logic is a design decision that will vary according to implementation.

An electric vehicle charging system is described herein that includes logic collocated with an electric service panel to monitor a total present electric current consumption value for all electric consumers below a point in the service panel. The system includes a first input to receive the present electric current consumption value from the logic collocated with the service panel, and to compare the present electric current consumption value with a maximum current capacity value for the service panel; and the system includes a second input to receive electric current from the service panel. The system includes an output to supply electric charging power to at least one electric vehicle and logic to set an electric charging current drawn from the service panel through the second input and provided to the electric vehicle charging output, to a value less than a difference between the maximum current capacity for the service panel and a sum of the present electric current consumption value and the current consumption value of a largest expected electric consumer. The largest expected electric consumer may be a single consumer, or a group of more than one electric consumers that are expected to be active at the same time, based on one or more of the time of day or day of the week.

The logic collocated with the electric service panel may interface with the electric service panel in the same manner as a circuit breaker device. A logic setting may be included for an offset amount of current reflecting a location of the logic collocated on the service panel along a hot rail of the service panel, the offset amount representing an amount of electricity used by electric consumers served by breakers above the collocated logic on the hot rail.

The output of the charging system may include multiple couplers to interface with multiple electric vehicles, and logic to load share the supply of electric charging power among the multiple couplers. The system may allocate the supply of electric charging power among the couplers according to charging requirements of the electric vehicles, for example asymmetrically among the electric vehicles. The supply of electric charging power provided to the output may be inversely proportional to an amount of time until a next driving session for a coupled electric vehicle and directly proportional to an amount of depletion of a battery of the coupled electric vehicle. The supply of electric charging power may be allocated among the electric vehicles based upon one or the more following: an electric vehicle battery size; an electric vehicle battery status; an electric vehicle battery average mean, median, or mode of daily miles driven; a charging history for an electric vehicle. The charging power may be allocated based on a rotating asymmetric duty cycle. A charging status for an electric vehicle may be provided to an interface whereby the charging status is communicated wirelessly to a consumer's wireless receiving data device.

FIG. 1 is an illustration of an embodiment of an electric vehicle charging environment. Features of both a residential and a commercial, e.g. public, EV charging station are illustrated together for convenience of description, although in practice, certain features may be implemented and probably would be implemented separately due to the different application environments. Power enters a master service panel 102 where the amount of current indicative of the total power consumption is tapped and measured by, in this example, an inductive clamp 126. The panel 102 provides power from taps after the master breaker 104 to various appliances 108 and other electric consumers within a household or commercial setting. Among the energy consumers, there is a primary consumer 110, a device or group of devices which, when activated, consumes more power than any other device in the environment. A power tap 106 is provided to an EV charging station 128. Information about total power consumption in the residence or commercial setting is provided via inductive tap 126 to the charging station 128. Charging station 128 comprises couplers to possibly multiple EVs 112 and 114, or in some cases only a single EV. Interface logic 122 may communicate with the EVs 112 and 114 to provide charging power and to ascertain status such as how low the battery has been depleted, its capacity, average daily miles, etc. The charging station 128 may further comprise an interface 124 to the master service panel as well as logic 120 to ascertain a charging cycle schedule and to implement various features of the charging station that have been described herein. An interface 118 to a wireless communication facility 116 may be provided as described herein.

In some applications a vehicle may receive charge from multiple sources. Charge sources may be categorized according to their capability to deliver charge. For example, a Level 1 and/or level 2 and/or level 3 charger and/or an energy storage system such as a battery "cache" and/or another electric vehicle may be employed. The charging client car could combine this charging sources to produce the quickest or most cost efficient charge. Consistent with this concept, a plug consisting of both an AC (Level 2 connector) and a DC (Level 3 connector) may be used.

Overall home or commercial site energy usage may be monitored to dynamically and automatically adapt or "fit" the usage of the electric power required for EV charging into the home or business electric energy budget. This solution may also provide an incremental layer of safety to the home electric system. The EV charging infrastructure may be time shared or load shared between two or more EVs parked near the same charging station.

Herein, Level 1 charging station means a charging station that delivers 110V AC×1 6 Amps-1.5 KW of charging capacity. Level 2 charging station means a charging station that delivers 220V AC×up to 70 Amps (more typically, 30 Amps)—6 KW-7 KW of charging capacity. A Level 3 charging station (also known as Fast Charger or Quick Charger) takes 480V three phase AC×100 Amps input, and delivers 200V-500V DC 100 Amp output—25 KW-50 KW of charging capacity.

An inductive electric power measurement clamping system or other current monitor arrangement may be installed at a master panel. This power measurement system continuously measures the overall power consumption of the home or a portion of the home. A signal path may be connected to the clamped inductive measurement device and extended, along with 220V power wires, to a home charging station (this solution may be used in commercial settings as well). The signal wire may be coupled to analog to digital circuitry in the charging unit. The charging unit enables the installer to program a Master Service Panel Size (eg. 100 Amp, 125 Amp, or 200 Amp) into the charging unit logic. Furthermore, a largest non-charging station electric consumer, or group of coordinated consumes, may be programmed into the charging unit (eg. electric dryer=220V×30 Amps). The charging unit dynamically varies its charging output based upon the overall available power, with room to accommodate a potential increase in demand.

The current/power monitor may be coupled above or below the main circuit breaker for the panel (providing a measure of total current/power for all consumers served by the panel). The current/power monitor may be coupled at a location in the panel receiving only a fraction of the total current to the panel. In this case, the measurement is for only those consumers served by a subsection of the panel. For example, if the monitor is coupled along the "hot" rail of the panel below X breakers, the current consumption of those X breakers will not be included in the power measurement provided by the monitor. However, a facility may be provided in the monitor device, or in the panel, to add an amount to any current measurement to account for the consumers located above the monitor device in the panel. The amount added to the current measurement is a presumed current consumption of the unmeasured consumers, and it may be a constant amount of current, or it may be an amount that varies according to other conditions, such as time of day, day of week, date, or the activity of other consumers in the panel.

Figure 2:
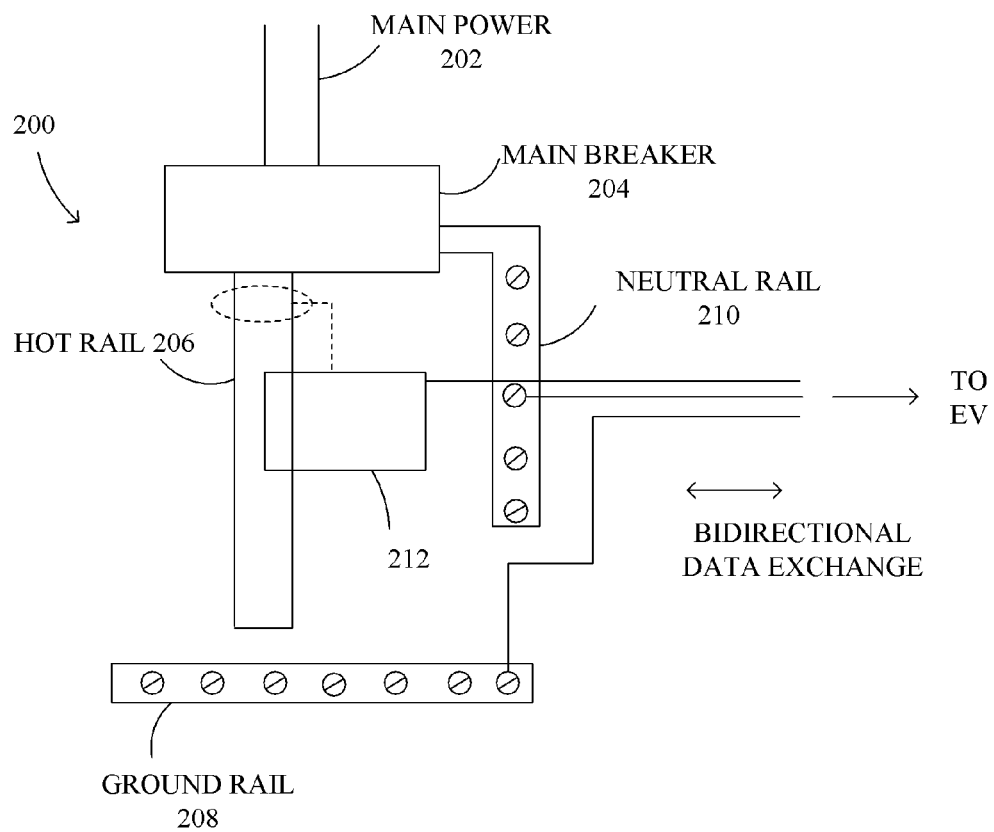
FIG. 2 is an illustration of an embodiment of a device installed at a power panel to facilitate electric vehicle charging.

FIG. 2 illustrates an example of a current monitor collocated in an electrical panel, and configured to interface with the panel as a circuit breaker. The power main 202 leads into the panel 200 at a main breaker 204. The panel 200 splits off the main 202 into a hot rail 206 (which is always carrying current) and a neutral rail 210, which carries current returning from a load. The panel may be grounded, and a ground rail 208 provided for grounding consumer outlets. Note that in some panels (e.g., main panels in residences), and depending on local building codes, the ground and neutral rails 208 210 may be one and the same.

A device 212 is provided to monitor current at a point along the hot rail 206. The device 212 may interface to the panel 100 as a circuit breaker would. The device 212 may control the delivery of current to an EV charging station or may function as the charging station itself If the device 212 is located directly under the main breaker 204, it can measure the entire current draw of all consumers coupled to the panel (including consumers on subpanels). Otherwise, as the device is located further down the hot rail 206, it measures current consumption of only those devices located below it on the hot rail 206. Note that the device could be located anywhere on the hot rail 206, but still measure current draw of all consumers on the panel by inductively coupling above or immediately below the main breaker 204. This is shown by dotted line 214.

The following is a description of an exemplary installation. A master panel has 125 Amps of capacity with 25 Amps being used at the instant moment and a potential new load of 30 Amps from a dryer, the system has 70 Amps of capacity to allot to the function of home charging . . . more than enough to allow for full charge for a single Level II charging session. If, however, the non-charging usage grows to 80 Amps during the charging session, the system dynamically reduces the Level II charging to 15 Amps, bringing the total usage to 95 Amps, which provides room for the dryer to be turned on without the master breaker tripping. At the point that the dryer is turned on, bringing the total power consumption to 125 Amps, the charging unit discontinues charging until electric capacity becomes available.

Another solution that may be implemented from the techniques described herein is as follows. From a single charging station that is electrically wired to provide a full charging service (220V/30-40 Amps) for one EV at a time, wire two or more EV charging connectors (JI 772). These connectors may be simultaneously plugged into two or more cars. A single station (e.g. 220V/30-40 Amps of electric charging capacity) may be intelligently controlled to load share or time-share the charging capacity amongst the EVs. If only one EV is plugged in, it may utilize 100% of the charging capacity.

If more than one EV is plugged in, the capacity may be shared by splitting the capacity based upon each car's charging requirements. When two or more EVs are plugged in, and one or more EVs completes its charge, the full electric charging capability of the charging station may be applied to the remaining not fully charged EV. The charging capacity may be shared on an equal basis or on an asymmetric basis, depending upon the connected cars' charging requirements.

The EVs charging requirements and charging priority may be manually programmed into the station with information such as expected time to next driving session (how long will the EV be parked). Alternatively, the charging station may set charging priority based upon information such as EV battery size (KWH capacity), battery status (how much charge exists in the battery), typical daily miles driven, and/or by learning the charging behavioral pattern and preferences of the EV over a period of time. To learn a vehicle's behavior, the charging station may record a vehicle identification and associate charging session information with the vehicle identification. Alternatively, the charging station may receive a vehicle identification from the vehicle or the user of the vehicle, and may access a central database (via a network) to obtain a charging/usage history profile for the vehicle. In the second approach, information from multiple charging sessions across multiple charging stations may be centrally located and accessible.

Combinations of load and time sharing may be employed. In one application the vehicle, or the charging station, apply inputs about when the car may be next used based upon previous driving patterns or manual user input of the data. Based upon these inputs and the knowledge of the available charging capability (load) the charging of multiple cars may be appropriately time shared or load shared based upon the time to departure and/or driving distance for the next trip. By way of example, two cars may be parked in a home garage. One car is used frequently for short trips to the store and driving kids to school. The other car is mostly used on the weekends. Depending upon the day and time and the anticipated need, the charging priority and load preference would be allocated based upon this data.

The charging station or the electric vehicle may log times and/or locations of a charge, and how much charge was applied. The vehicle may also log driving information, such as distances traveled and when and where it traveled. When the station performs the logging, it may also identify the vehicle that received the charge and associate an identification of the vehicle with the time/location/amount information. The charging station and the vehicle may communication information wirelessly (e.g., Bluetooth or other short-range wireless technology) or via the charging adaptor itself (e.g., XI 0), using known approaches. For example, an electric vehicle may record its charging history and/or driving history, which includes times, dates, locations, and/or amounts of charge, as well as possibly including routes and distances traveled and when traveled. Some or all of this information may be provided to the charging station, which then makes settings so that the vehicle receives an appropriate allocation of charging capacity for the time it is expected to remain coupled to the station. Or, the electric vehicle may compute a desired charge allocation based on the recorded factors and request this allocation from the charging station, which may set an appropriate price to meet the vehicle's charging requirements in the time allotted and/or under the conditions prevailing.

In one implementation, the charging station keeps track of a vehicle's driving/charging profile (as described above), and enables this charging profile to be transferred to other vehicles. The exchange of driving/charging profiles between charging stations and vehicles may take place using known communication techniques, as described above.

In another application, the cars exchange charge (siphon from one car or multiple cars to the other) based upon this data. Other electric consumers on the network (e.g., home appliances) may also participate in the sharing mechanism. If, historically, a dryer appliance is not used at midnight, more power through the panel may be made available for the charging of the automobiles. Or an appliance may signal the panel indicating it will not be operated for certain time periods, thereby allowing the allocation of more power to charge vehicles during those times. In anticipation of a vehicle being plugged in for charging, the panel may decrease the electricity available to power other consumers in the home; if the vehicle isn't plugged in at or within a predetermined interval of the expected time, the reserved electricity may be released for use by other consumers.

In a public/commercial setting, the consumer may plug in and "compete" for capacity via a pricing or bidding mechanism. Alternatively to sharing the load simultaneously, a round robin time sharing algorithm may be applied to the two or more cars plugged into the same charging station via the multiple connectors. In this instance, one EV may receive 100% of the charging capacity for a specified period of time. At the end of that period of time, the next car may receive 100% of the charging capacity, and so on. This approach allows for an asymmetric approach in which one EV receives 75% of the capacity for a fixed period of time, the second car receives 25% for that period of time, and the third car receives 0%. At the end of the fixed period of time, the allocation rotates. The first car receives 0%, the second car receives 75%, and the third car receives 25% . . . and so on, until the cars are fully charged or disconnected from the system.

In all of the above cases, the EV owner may be informed of the charging status of each car connected to the single charging station via a web connected and/or wireless device such as a smartphone. The information conveyed is an estimated time to charge completion of other cars on the single charge station.

A charge consumer may set a price he/she is willing to pay for a charge and prioritized based upon other bids for that charging session. Similarly the consumer could pay for an "assured" delivered charge (the equivalent of "buy it now" or certified delivery). Providers of power, including drivers of other cars, could offer the power in their battery packs to be shared at a given price with others requiring a charge with more immediate need than they might have. The donor car could set parameters such as, sell my charge at $1 per KWH but not below ½ tank. Or by time . . . sell my 50% of my charge until 4 pm.

These parameters may be pre-set by the provider/consumer, and/or set in real-time with a bidding system, with control and notification done from a computer, a smartphone and/or an system on board the car. Additionally, the consumer may allow the system to automatically make the decisions based upon any and all of the above data discussed above.

Additional embodiments for sharing charging infrastructure amongst multiple EVs are to automatically stop the charging session once an EV is fully charged, and close out that account session. This allows the owner of another EV to legitimately disconnect the station connector from the first EV account session and plug it into his EV. The cessation of the session may physically release (unlock) the connector, close the account session, notify the first EV owner that his EV is charged, update the status of the charge station to indicate that a EV charging spot is open.

Implementations and Alternatives

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" or "circuits" or the like includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved.

Hence, any two components herein combined to achieve a particular functionality can be seen as "associated with" each other such that the desired functionality is achieved, irrespective of architectures or intermedial components.

Likewise, any two components so associated can also be viewed as being "operably connected", or "operably coupled", to each other to achieve the desired functionality.

What is claimed is:

1. An electric vehicle charging system, comprising:
   a monitor to monitor a total present electric current consumption value for all electric consumers below a point in a service panel of the electric vehicle charging system;
   a first input to receive the present electric current consumption value monitored by the monitor, and to compare the total present electric current consumption value with a maximum current capacity value for the service panel;
   a second input to receive electric current from the service panel; and
   an output for electric charging power drawn from the service panel through the second input, wherein the electric charging power is dynamically supplied through the output to a set of one or more electric vehicles so as not to cause the total present electric current consumption value to exceed the maximum current capacity.

2. A charging unit to charge a set of one or more electric vehicles, comprising:
   a processor and a non-transitory machine-readable medium that stores instructions that, when executed by the processor, cause the charging unit to:
     receive a present electric current consumption value that represents a total present electric current consumption value at a single electric service panel in which the charging unit is connected, wherein the present electric current consumption value is less than a maximum current capacity for the single electric service panel, and
     cause electric charging power to be dynamically supplied to the set of one or more electric vehicles through the single electric service panel such that the dynamically supplied electric charging power to the set of one or more electric vehicles does not cause the present electric current consumption value to exceed the maximum current capacity for the single electric service panel.

3. The charging unit of claim 2, wherein the dynamically supplied electric charging power to the set of one or more electric vehicles through the single electric service panel accounts for a potential increase in the total present electric current consumption due to a set of one or more electric consumers other than the charging unit drawing electric current through the single electric service panel.

4. The charging unit of claim 3, wherein the set of electric consumers includes at least a largest expected electric consumer, wherein the largest expected electric consumer is a group of more than one electric consumers that are expected to be active at the same time, based on one or more of a time of day and day of the week, that time corresponding to potential increase in demand for electric current.

5. The charging unit of claim 2, wherein the dynamically supplied electric charging power to a particular electric vehicle is inversely proportional to an amount of time until a next driving session for that electric vehicle and directly proportional to an amount of depletion of a battery of that electric vehicle.

6. The charging unit of claim 2, wherein the non-transitory machine-readable medium further stores instructions that, when executed by the processor, cause the charging unit to:
   communicate a charging status for the set of one or more electric vehicles to one or more wireless receiving data devices.

7. The charging unit of claim 2, further comprising:
   wherein the set of one or more electric vehicles includes at least two electric vehicles; and
   wherein the non-transitory machine-readable medium further stores instructions that, when executed by the processor, cause the charging unit to:
     load share the dynamically supplied electric charging power to the at least two electric vehicles.

8. The charging unit of claim 7, wherein the load share of the dynamically supplied electric charging power is based upon at least charging requirements of the at least two electric vehicles.

9. The charging unit of claim 8, wherein the load share of the dynamically supplied electric charging power is also based upon charging requirements of a set of one or more electric consumers other than the at least two electric vehicles.

10. The charging unit of claim 9, wherein potential increase in demand for electric current depends on historical usage by the set of electric consumers other than the at least two electric vehicles.

11. The charging unit of claim 7, wherein the load share of the dynamically supplied electric charging power is performed asymmetrically among the at least two electric vehicles.

12. The charging unit of claim 11, wherein the load share of the dynamically supplied electric charging power is based on a rotating asymmetric duty cycle.

13. The charging unit of claim 7, wherein the load share of the dynamically supplied electric charging power among the at least two electric vehicles is based upon one or more of the following:
   an electric vehicle battery size of each of the at least two electric vehicles;
   an electric vehicle battery status of each of the at least two electric vehicles;
   an electric vehicle battery average mean, median, or mode of daily miles driven of each of the at least two electric vehicles; and
   a charging history of each of the at least two electric vehicles.

14. A method, comprising:
   receiving a present electric current consumption value that represents a total present electric current consumption value at a single electric service panel in which a charging unit is connected, wherein the present electric current consumption value is less than a maximum current capacity for the single electric service panel, and
   causing the charging unit to dynamically supply electric charging power through the single electric service panel to a set of one or more electric vehicles such that the dynamically supplied electric charging power to the set of one or more electric vehicles does not cause the present electric current consumption value to exceed the maximum current capacity for the single electric service panel.

15. The method of claim 14, wherein the dynamic supplying to the set of one or more electric vehicles through the single electric service panel accounts for a potential increase in the total present electric current consumption due to a set of one or more electric consumers other than the charging unit drawing electric current through the single electric service panel.

16. The method of claim 15, wherein the set of electric consumers includes at least a largest expected electric consumer, wherein the largest expected electric consumer is a group of more than one electric consumers that are expected to be active at the same time, based on one or more of a time of day and day of the week, that time corresponding to potential increase in demand for electric current.

17. The method of claim 14, further comprising:
communicating a charging status for each of the set of one or more electric vehicles to one or more wireless receiving data devices.

18. The method of claim 14, wherein the set of one or more electric vehicles includes at least two electric vehicles, the method further comprising:
load sharing the dynamically supplied electric charging power drawn from the single electric service panel to the at least two electric vehicles.

19. The method of claim 18, wherein the load sharing of the dynamically supplied electric charging power drawn from the single electric service panel to the at least two electric vehicles is based upon at least one of charging requirements of the at least two electric vehicles, and of charging requirements of a set of one or more electric consumers other than the at least two electric vehicles.

20. The method of claim 18, wherein the load sharing of the dynamically supplied electric charging power drawn from the single electric service panel to the at least two electric vehicles is performed asymmetrically among the at least two electric vehicles.

21. The method of claim 18, wherein the load sharing of the dynamically supplied electric charging power drawn from the single electric service panel to the at least two electric vehicles is based upon one or more of the following:
an electric vehicle battery size of each of the at least two electric vehicles,
an electric vehicle battery status of each of the at least two electric vehicles,
an electric vehicle battery average mean, median, or mode of daily miles driven of each of the at least two electric vehicles, and
a charging history of each of the at least two electric vehicles.

\* \* \* \* \*